United States Patent [19]

Deremo et al.

[11] Patent Number: 4,901,587

[45] Date of Patent: Feb. 20, 1990

[54] DRILL TEST FIXTURE

[75] Inventors: Edwin J. Deremo; Joseph Carter; Kenneth LaCount, all of Lexington, S.C.

[73] Assignee: Cooper Industries, Inc., Houston, Tex.

[21] Appl. No.: 36,764

[22] Filed: Apr. 10, 1987

[51] Int. Cl.⁴ .......................................... G01M 19/00
[52] U.S. Cl. ...................................... 73/865.9; 73/11
[58] Field of Search .................... 73/865.9, 862.06, 11, 73/862, 1 C, 862.49, 813, 818, 825

[56] References Cited

U.S. PATENT DOCUMENTS

| | | | |
|---|---|---|---|
| 1,062,662 | 5/1913 | Paynter | 73/11 |
| 1,576,465 | 3/1926 | Pryce | 73/11 |
| 2,004,950 | 6/1935 | Jenkins | 73/11 UX |
| 2,761,307 | 9/1956 | Williams | 73/11 |
| 2,909,922 | 10/1959 | Haman | 73/11 X |
| 3,264,873 | 8/1966 | Svenson | 73/865.9 |
| 4,123,187 | 10/1978 | Turner | 408/17 |
| 4,164,871 | 8/1979 | Cole et al. | 73/865.9 |
| 4,693,122 | 9/1987 | Griffith | 73/865.9 X |

FOREIGN PATENT DOCUMENTS

| | | | |
|---|---|---|---|
| 125785 | 6/1958 | U.S.S.R. | 73/11 |
| 514949 | 9/1976 | U.S.S.R. | 73/11 |
| 563582 | 6/1977 | U.S.S.R. | 73/11 |
| 613092 | 6/1978 | U.S.S.R. | 73/865.9 |
| 626196 | 9/1978 | U.S.S.R. | 73/865.9 |
| 630397 | 10/1978 | U.S.S.R. | 73/865.9 |

Primary Examiner—Tom Noland
Attorney, Agent, or Firm—Eddie E. Scott; Alan R. Thiele

[57] ABSTRACT

A test fixture for comparing the performance characteristics of air feed drills includes a frame and a simulated linear thrust load. Included also is a peck counter, a linear transducer for measuring stroke length, and an rpm counter. These measurements are visually displayed and may be optionally used as inputs for the calculation of various operational ratios which may also be displayed.

15 Claims, 1 Drawing Sheet

DRILL TEST FIXTURE

BACKGROUND OF THE INVENTION

The present invention applies to test fixtures, more particularly the present invention applies to test fixtures for air feed rotary drills.

Air feed and/or peck air feed drills are being used with increasing frequency in machining operations, particularly for the drilling of holes in exotic or brittle materials or where exceptionally smooth surfaces are required on the inside surface of the finished hole. In order to accurately control the process of hole drilling with an air feed drill or peck air feed drill, it is necessary that the total drill travel per cycle time, the number of pecks per cycle time and the rpm be tightly controlled once established for a given hole drilling operation. This is required for all drills used in the same manufacturing process.

To set up the operational parameters for a group of air feed drills or peck air feed drills there is a need to provide a test fixture which allows each drill to be compared to a standard so that the proper operational parameters can be established in the controls for the air feed drill being tested. Such operational parameters include the number of pecks per cycle time, the drill travel per cycle time and the rpm of the drill. Once these operational parameters have been established and measured, they may be combined into operational ratios.

SUMMARY OF THE INVENTION

A test fixture for comparing the operational performance characteristics of an air feed or peck air feed drill to a standard is the subject of the present invention. The fixture includes a frame in which the air feed or peck air feed drill is mounted. Attached to the end of the fixture frame is a hydraulic cylinder which simulates a drilling thrust load. Measurements of operational parameters are obtained by electrical devices such as a linear transducer which records the stroke length of each peck and the total drill travel, a counter for recording the number of pecks and an angular transducer for recording rpm. The test operation of the air feed drill is controlled by a timing device.

The total drill travel per operational cycle time, the number of pecks per drill cycle time, rpm and drill cycle time are digitally displayed. If desired, the outputs of the measuring devices may be transformed into ratios such as the peck frequency, that is the number of pecks of the self feeding peck drill divided by the drilling cycle time; the rate of feed of the self feeding peck drill, that is the stroke length divided by the drilling cycle time, or the inches of feed of the peck drill per drill revolution.

BRIEF DESCRIPTION OF THE DRAWINGS

A better understanding of the test fixture for comparing and measuring the performance characteristics of an air feed or peck air feed drills may be had by reference to the figures wherein.

DETAILED DESCRIPTION OF THE EMBODIMENTS

Figures 1, 2:
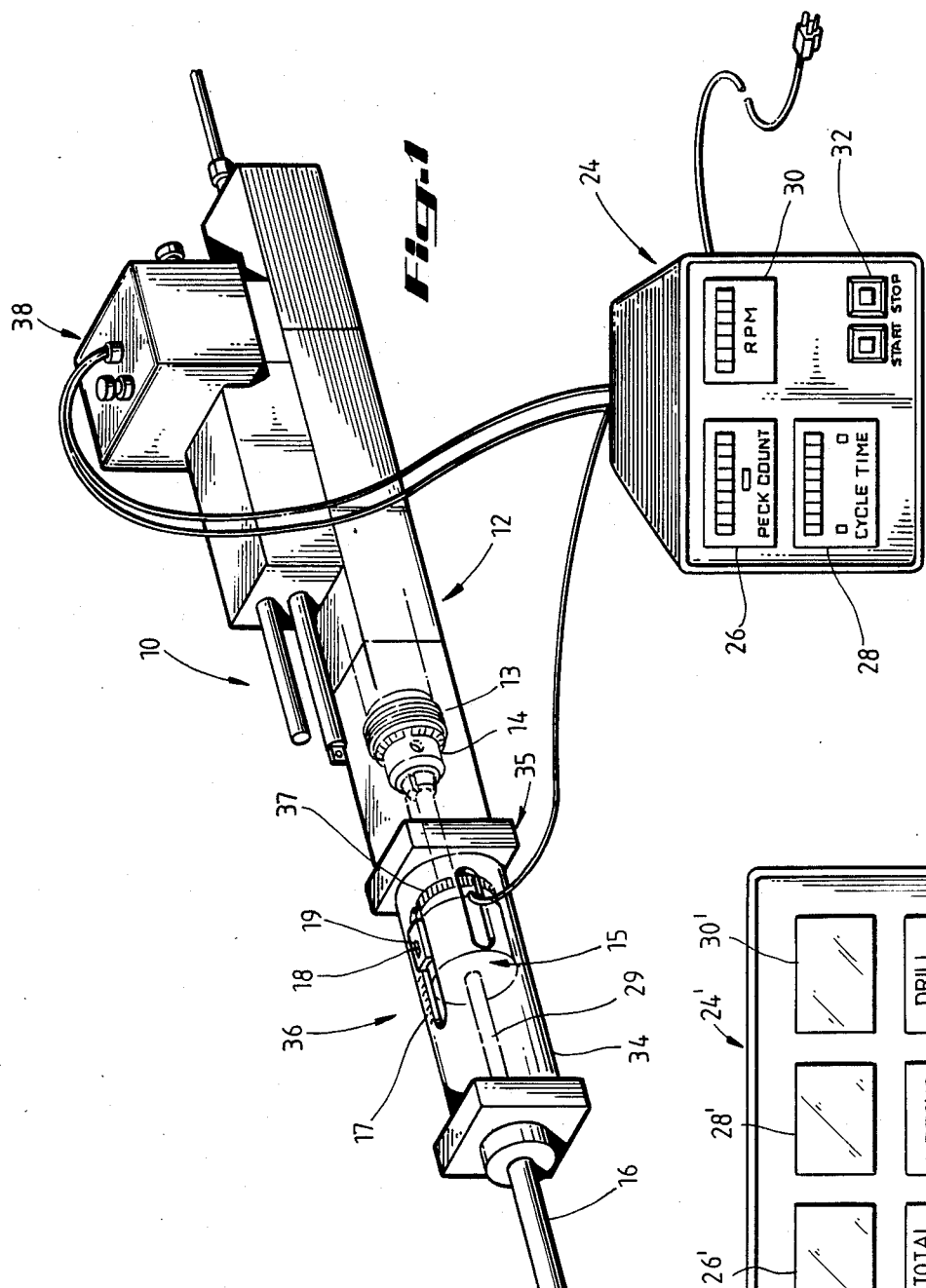
FIG. 1 is a perspective view of the device for checking the performance characteristics of a self feeding air feed drill or peck air feed drill.
FIG. 2 is an alternate form of the readout assembly.

The self feeding drill test fixture assembly 10 of the present invention is used for measuring and comparing the operational characteristics of air feed or peck air feed drills 12. The test fixture assembly 10 includes a frame 36 which is of sufficient size to contain the nose portion 14 of the automatic feed drill 12. A threaded collar or adapter 13 is placed around the nose portion 14 of peck drill 12 for threadable engagement with plate 35 of frame 36. Drill 12 is shown separated from frame 36 in figure for clarity. Sliding within test fixture assembly 10 is a work receiver 15 which is moved laterally within cylindrical guide path 34 by drill 12. At the end of frame 34 is a cylinder 16 which provides a simulated linear thrust load for air feed drill 12. Such linear thrust loads are accurately provided by precise hydraulic cylinders which are valved to accurately control the flow of hydraulic fluid from one side of the movable piston to the other side of the movable piston within the hydraulic cylinder.

Mounted within a slot 17 in frame 36 is a linear transducer 18 which slides forward with each feed cycle of the drill, measures and displays the linear travel of the air feed drill 12 through window 19. An angular transducer 37 is mounted on drive adapter for sensing drill rpm which is displayed on readout 30. Interposed between the work receiver 15 and the rod portion 29 of hydraulic cylinder 16 is a pressure sensitive electrical switch (not shown) of a design well known to those skilled in the art, which switch records the number of pecks on readout 26.

If desired, readout assembly 24 may also be designed for forming ratios from the various parameters or forming a ratio of a measured parameter with respect to elapsed drilling time. For instance, the number of pecks 26 may be measured against a drilling cycle time 28 for determining the peck cycle frequency. Additionally, the stroke length of the test cycle may be compared to the time of test cycle for determining the rate of drill feed travel per unit of time. The time of each test cycle of drill operation is controlled through the use of an internal timer 28 which controls the operation of air control valves 38. When additional readouts are necessary a multi-windowed display 24' may be used as shown in FIG. 2 as illustrated therein as in FIG. 1 peck 7 count, cycle time, and RPM displays, herein labelled 26', 28', and 30' respectively, are again illustrated along with additional displays for total drill travel 39, peck cycle rate in number of pecks per minute 40, and drill travel rate in inches per minute 41. For each of presentation the start/stop switch is not illustrated. As seen in FIG. 1 valve control may be manually bypassed by means of stop switch 32.

To assure proper control over drilling operations using air feed drills, it is important that the required operational parameters be set in each drill used in a drilling operation. The first step is to set up a master drill by trial and error of actual drilling on the application that yields the proper results. All other drills are then to be compared and calibrated to the master drill. This is accomplished by placing the master drill in test fixture 10 of the present invention and recording the operational parameter readings. It is not required that the actual performance of the master air feed drill on the workpiece be known. All that is required is to know how the master air feed drill performs as on the test fixture. Because of the constant, repeatable thrust load within fixture 10, a set of test measurements can be established where the master air feed drill with desired parameters set therein is placed in fixture 10. The test fixture 10 of the present invention then allows the operational parameters of the other air feed drills to be accurately set as compared to the test measurements recorded from the master air feed drill. The repeatable thrust load provided by cylinder 16 provides the same workload for each drill compared to the master air feed drill. Accordingly each drill may be set for the same number of pecks, the same feed rate and the same rpm. Accordingly, all the various drilling parameters may be established for each air feed drill 12 before the drill used in production. After production air feed drills have been set up, they may be periodically checked and re-set as necessary.

OPERATION

The self feeding air feed drill test fixture 10 may be used either with an air feed peck drill 12 or a continuously self-feeding air feed drill; that is, a drill having one long continuous peck. Measurement of a drill's operational parameters is accomplished by mounting a master drill in fixture 10. As previously described the master drill performs as desired in production. Its operational characteristics may be measured by Fixture 10, as follows.

The operational time for the air feed drill would be set to some short time period such as 15 seconds and the drilling cycle started. The length of drill travel, the number of pecks and the rpm are recorded from the various displays. The time could then be reset for a longer run if 15 seconds was insufficient. Once the desired cycle time is achieved the number of pecks and linear displacement associated with that cycle time would be recorded. The peck cycle time is now set to zero and the drill is run through its operational cycle again. This time the stroke length and other operational parameters are recorded. The pecks are then reset to the initial value and the drill is put into production.

For illustration an example of such data follows:
Application and Job #1 Cycle Time Setting: 1 min
Travel(Pecking) 0.825 in.
No Pecks: 24
Length of travel when not pecking: 1.080 in.

Each time a new drill 12 is to be used for Job #1 the new drill would be placed in the test fixture and the operational parameters set on the air feed drill controls. For exemplary purposes the same data is used. The timer would be set to 1 minute and the peck control set for zero pecks. The drill run is accomplished and the stroke length is compared to 1.080 in. If the stroke length is greater than 1.080 in. the drill feed control is adjusted to provide a slower rate. If it is less than 1.080 in. the drill feed control is set for a faster rate. The adjustment process is repeated until the length of travel in one minute equals 1.080 in. The number of pecks is then adjusted to achieve 24 pecks in one minute. The distance per test cycle should now be about 0.825 in. For drills not equipped with a pecking feature the procedure is the same except for omitting those steps dealing directly with pecking.

Periodically, drills may be pulled from production and their performance checked. The test fixture may also be used for trouble shooting whenever it appears that drilled holes do not meet manufacturing specifications.

There is thereby provided by the air feed drill test fixture of the present invention a device for comparing, the various operating parameters of self feeding drills. The foregoing embodiments are intended t illustrate the present invention and not to limit it in spirit or scope.

What is claimed is:

1. A device for comparing the performance characteristics of air feed or peck air feed drills, said device comprising:
   a frame;
   means for mounting the air feed or peck air feed drill within said frame;
   a simulated linear thrust load;
   means for coupling the work output of the air feed or peck air feed drill to said simulated linear thrust load;
   said means for coupling the workout output of the air feed or peck air feed drill to the simulated thrust load further including:
   means for counting the umber of pecks;
   means for measuring drill travel;
   means for measuring drill rpm; means for controlling the time of drill operation.

2. The device as defined in claim 1 wherein said means for measuring drill travel is a linear transducer.

3. The device as defined in claim 2 wherein said means for controlling includes means for manually starting and stopping the operation of the air feed or peck air feed drill.

4. The device as defined in claim 1 further including a time controlled automatic shutoff of the air feed or peck air feed drill.

5. The device as defined in claim 1 further including means for dividing the number of pecks by the drilling cycle time.

6. The device as defined in claim 5 further including means for dividing the stroke length of each peck by the drilling cycle time.

7. The device as defined in claim 1 further including means for displaying rpm, peck count and total drill travel, number of pecks per minute and inches traveled per minute.

8. The device as defined in claim 1 wherein said means for measuring drill rpm is an angular displacement transducer.

9. The device as defined in claim 1 wherein said simulated thrust load is provided by a hydraulic cylinder.

10. A device for comparing the performance characteristics of an air feed drill, said device comprising:
    a frame;
    means for mounting the air feed drill within said frame;
    a simulated linear thrust load;
    means for coupling the work output of the air feed drill to said simulated linear thrust load;
    said means for coupling the workout output of the air feed drill to said simulated linear thrust load further including:
    means for measuring linear drill travel;
    means for measuring drill rpm;
    means for controlling the time of drill operation.

11. The device as defined in claim 10 wherein said means for controlling the time of drill operation includes manual means for starting and stopping the air feed drill.

12. The device as defined in claim 11, wherein said means for measuring drill rpm includes an angular displacement transducer.

13. The device as defined in claim 10 further including a time-controlled automatic shutoff of the air feed drill.

14. The device as defined in claim 10 further including means for visually displaying the measured values.

15. A method for comparing the performance characteristics of air feed or peck air feed drills, said method comprising the steps of:
  coupling an air feed or peck air feed drill to a simulated linear thrust load;
  controlling the drill cycle time;
  counting the number of pecks;
  measuring total drill travel;
  measuring rpm of the self feeding drill.

* * * * *